Feb. 2, 1971 D. A. CALLESON 3,559,466
DIRECT READOUT DEFLECTION METER
Filed June 7, 1968 5 Sheets-Sheet 1

INVENTOR
DONALD A. CALLESON
BY
Kenyon & Kenyon
ATTORNEYS

Feb. 2, 1971 D. A. CALLESON 3,559,466
DIRECT READOUT DEFLECTION METER
Filed June 7, 1968 5 Sheets-Sheet 3

INVENTOR
DONALD A. CALLESON
BY
Kenyon & Kenyon
ATTORNEYS

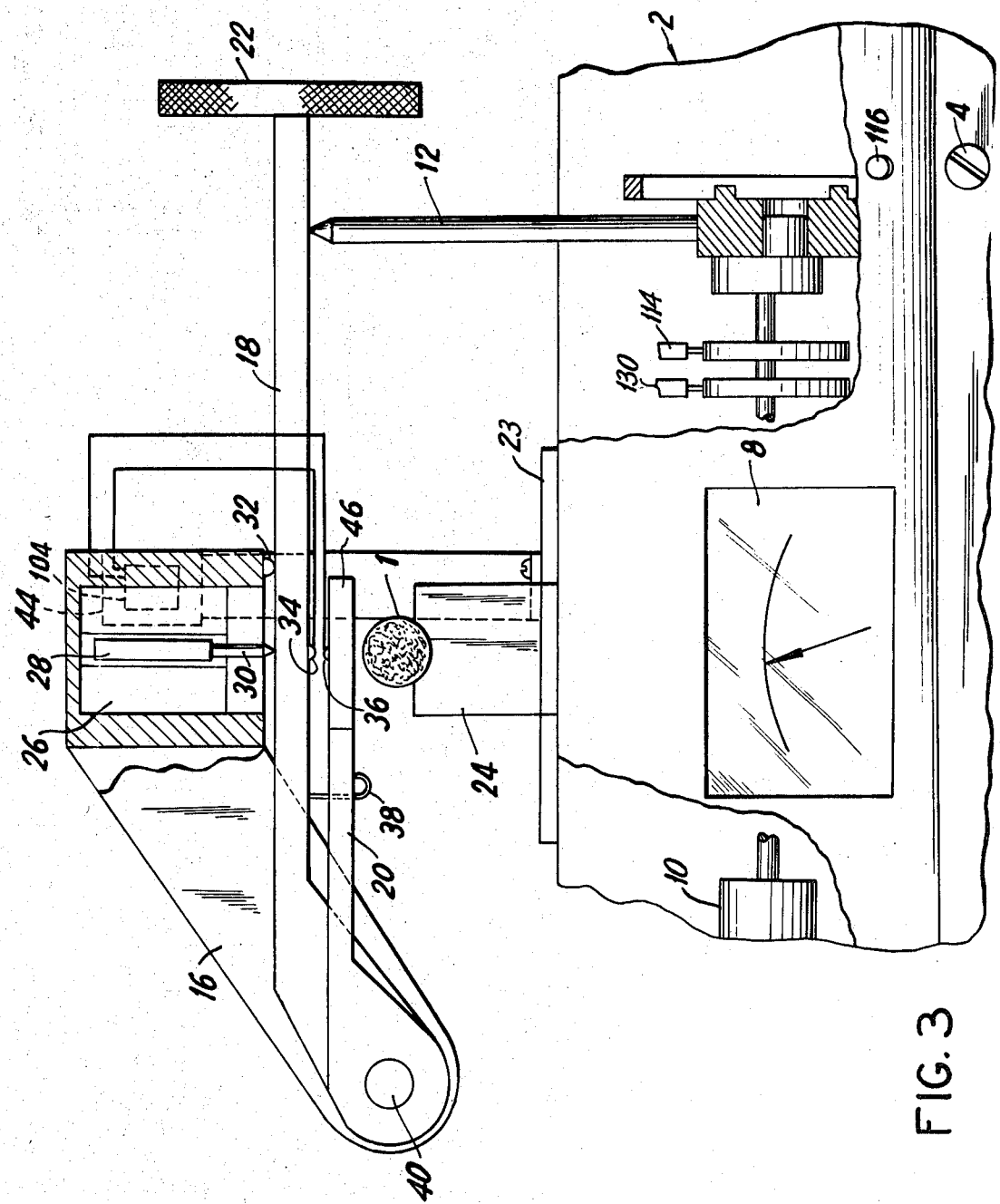

United States Patent Office 3,559,466
Patented Feb. 2, 1971

3,559,466
DIRECT READOUT DEFLECTION METER
Donald A. Calleson, Durham, N.C., assignor to Liggett & Myers Incorporated, New York, N.Y., a corporation of Delaware
Filed June 7, 1968, Ser. No. 735,435
Int. Cl. G01n 3/42
U.S. Cl. 73—81      13 Claims

ABSTRACT OF THE DISCLOSURE

This invention relates to a device for measuring the firmness of a cigarette, cigarette filter rod, or similar test specimen. Basically, the device is a mechanism comprised of an assembly of levers which mount a weight of predetermined mass and an apparatus to accurately measure the firmness of the test specimen. In operation, the weight reacts, through the assembly of levers, to compress the test specimen while the measuring apparatus senses and measures the attendant depression of the test specimen.

FIELD OF INVENTION

This invention has application in any environment wherein the precise measurement of compressibility or firmness of any object is desired. It has particular application in measuring the compressibility or firmnes of cigarettes or cigarette filter rods.

DESCRIPTION OF THE PRIOR ART

Presently, cigarettes and cigarette filter rods are measured by mechanical deflection meters. Basically, the prior art deflection meter is comprised of a single lever arm assembly having a weight mounted thereon which reacts on the specimen being measured through a pressure foot on the lever arm and a gauge adapted to measure the elevation of the pressure foot. As a consequence, the present mechanical measuring mechanism is not equipped to afford an automatic single readout for each specimen tested. Instead, an operator is required to bring the pressure foot into contact with each specimen, record the reading on the gauge and depress a start button to initiate placement of a greater load on the test specimen. A second reading, relating to the deflection of the test specimen is then required to be made on the mechanical dial guage, thereby providing a differential which is directly proportional to the firmness of the test specimen.

The design of the prior art measuring mechanism militates against both accuracy and consistency in measurement since it is necessary for an operator to manually locate the pressure foot on the test specimen each time.

In the cigarette industry, it is critical that the cigarettes and filter rods be of a constant firmness. In addition, a precise method of measuring firmness is important from the standpoint of arriving at an optimum tobacco content for each cigarette. Important economic advantages can be gained by determining the optimum quantity of tobacco necessary to fill each cigarette to a consistenty satisfactory firmness.

The disadvantages of using a measuring mechanism which is subject to operator bias and, as a consequence, imprecise measurement, and more critically, inconsistent measurement can be obviated by the present invention.

SUMMARY OF THE INVENTION

It is an object of the present invention to provide an apparatus capable of measuring the compressibility or firmness of a cigarette, cigarette filter rod or similar specimen.

It is an additional object of the present invention to provide an assembly which will measure the compressibility of a specimen in a single operation.

It is a further object of the present invention to provide an apparatus which will measure with constant precision the compressibility of a multiplicity of specimens in seriatim.

A still further object of the present invention is to provide an apparatus capable of measuring the compressibility of a test specimen which will eliminate the need for manual operation and manual setting of the recording device.

These objects are achieved by providing a measuring apparatus comprised of three independent beams designed to exert a force on a test specimen and measure the attendant deflection. Basically, the three beams are adapted to concomitantly rotate about a common pivot point and are maintained in spaced relationship by spacer means prior to contact with the specimen being tested for compressibility. More particularly, the three-beam assembly can be characterized as having a lower beam, a middle beam an an opper beam. The lower beam is designed to directly contact the test specimen and, as a consequence, is provided with a pressure foot for that purpose. The middle beam carries a weight which, at the desired time, will react through contacts on the middle and lower beam, to transmit its force directly to the specimen. In addition, the middle beam has mounted thereon a transformer core which is axially arranged within a transformer stator mounted on the upper beam. In operation, the three-beam assembly is concomitantly rotated by a motor around a common point until the pressure foot of the lower beam contacts the specimen. At this point, the lower beam is prevented from moving while the middle and upper beams continue to rotate concomitantly. Next the contacts of the lower and middle beams will make and thereby close the circuit which energizes a brake designed to prevent the upper beam and transformer stator from further movement. At this point the weight of the middle beam transmits its force through the contacts and pressure foot to the specimen. As the specimen deflects in response to this force the middle and lower beams deflect accordingly and the transformer core mounted on the middle beam translates with respect to the transformer stator. The deflection of the cigarette specimen is thereby recorded on a meter calibrated to read the displacement of the transformer core.

BRIEF DESCRIPTION OF THE DRAWINGS

The invention will be described further by way of example, with reference to the accompanying drawings wherein:

FIG. 3 is a partial front view of FIG. 1 with a portion of stator 26 broken away.

DESCRIPTION OF THE PREFERRED EMBODIMENT

Figure 1:
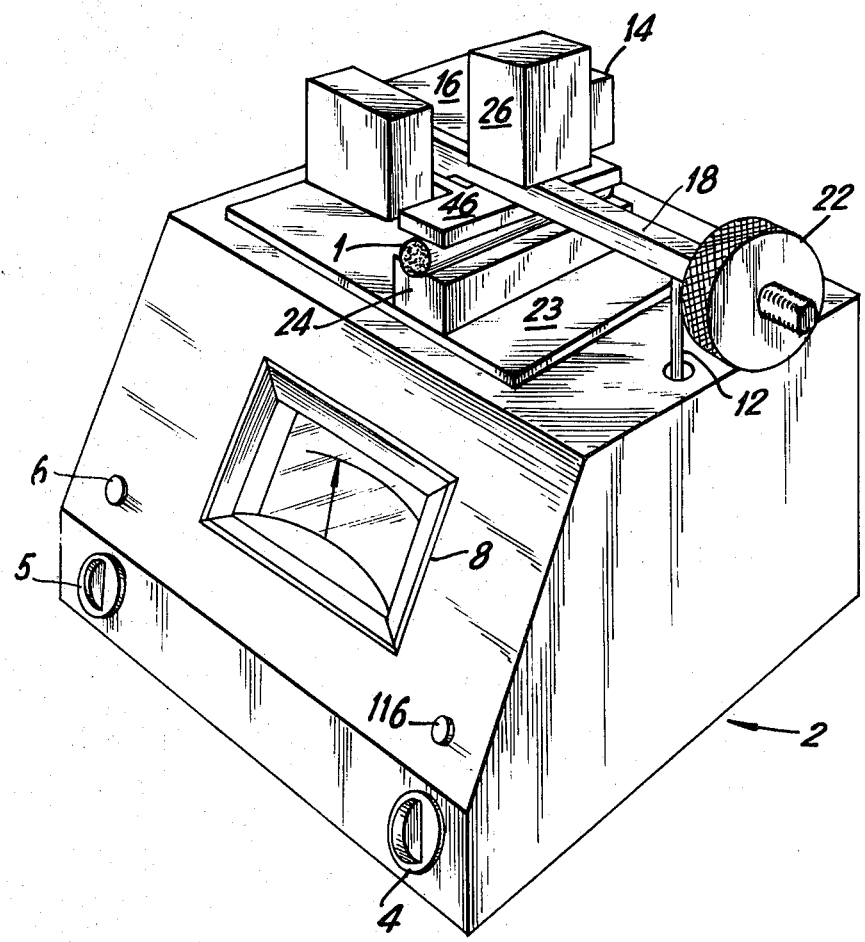
FIG. 1 shows a perspective view of the compressibility measuring apparatus mounted in a console.

The three-beam assembly designed to measure compressibility of a cigarette, cigarette filter rod or similar test specimen 1 is shown in FIG. 1, mounted in a console 2. As best seen in FIG. 1, the console 2 houses a centrally disposed meter 8 which records the compressibility of each specimen 1 and mounts the measuring apparatus which is designed to transmit the force of a weight 22 to the test specimen 1 and measure the deflection thereof. In addition, a lift rod 12, which operates to uniformly and repeatably lower the three-beam assembly and then return it to its original position after each measuring operation, protrudes from the console 2 to engage the middle beam 18.

A level flat plate 23 is secured to the top of console 2 to facilitate mounting both the apparatus and an anvil 24 adapted to accommodate the test specimen.

The console 2, in addition to housing the meter 8, houses the circuitry for the entire system and the motor to operate the system lift rod 12. As best seen in FIG. 1, a power switch 5 is provided to turn the measuring assembly on and off while a typical power light 6 is provided to indicate the presence of power in the system.

A start switch 116 is provided to start a measuring cycle. A range switch 4 provides the ability to read an expanded meter scale for increased accuracy at low meter readings.

The detail of the beam assembly is best seen in FIG. 3 wherein the upper beam 16, the middle beam 18 and the lower beam 20 are shown pivotally mounted on shaft 40 for concomitant rotation therearound. Any appropriate bearing mount such as precision ball bearings in a race may be employed to mount the three-beam assembly since the lift rod 12 will prevent rotation of the assembly during the inoperative period.

The upper beam 16 has mounted therein the stator 26 of a linear differential transformer and a spacer device 32 which maintains upper beam 16 in spaced relationship with middle beam 18.

The middle beam 18 is designed to have the weight 22 mounted thereon and the transformer core 28 which, by means of rod 30, is maintained axially within the transformer stator 26. In addition, an electrical contact 34 is arranged on the lower surface of middle beam 18 and a hook-like restraining member 38 is adapted to extend from middle beam 18 to maintain the middle beam 18 and lower beam 20 in spaced relationship.

The lower beam 20 terminates in a pressure foot 46 arranged to contact the test specimen 1. Also mounted on the lower beam 20 is an electrical contact 36 located directly below electrical contact 34 and in the same vertical plane.

The contacts 34 and 36 are connected to an electrical circuit leading to an electromagnetic brake 14 which functions to lock beam 16 and transformer stator 26 in a fixed position. The brake 14 is comprised of an electromagnet 104 and a thin soft iron plate 44 rigidly fixed to the rear side of the transformer housing as seen in phantom in FIGS. 2a, 2b, 2c and 2d. Energization of the electromagnet 104 which is firmly mounted on plate 23 will set up a magnetic force on the thin iron plate 44 thereby locking the stator 26 in a fixed position.

The operation of the compressibility measuring apparatus can best be seen by the respective steps depicted in FIGS. 2a, 2b, 2c and 2d. Initially, a test specimen 1 is placed on anvil member 24 and the start switch 116 is turned on thereby energizing electric motor 10. The electric motor 10, by means of a cam assembly or any other suitable mechanical linkage arrangement retracts lift rod 12 into the console 2 thereby allowing upper beam 16, the middle beam 18 and the lower beam 20 to rotate accordingly as the middle beam 18 follows the lift rod 12. The upper beam 16, the middle beam 18 and the lower beam 20 are maintained in vertical spaced relationship by spacer member 32 and restraining member 38 during the initial stages of the operation.

The rotation of the three-beam assembly in the clockwise direction continues until the pressure foot 46 contacts the test specimen 1. At that point the lower beam 20 is prevented from rotation by the test specimen 1 while upper beam 16 and middle beam 18 continue their concomitant clockwise rotation as the middle beam 18 follows the lift rod 12 which continues to be further retracted into the console 12 by the motor 10.

Figure 2A:
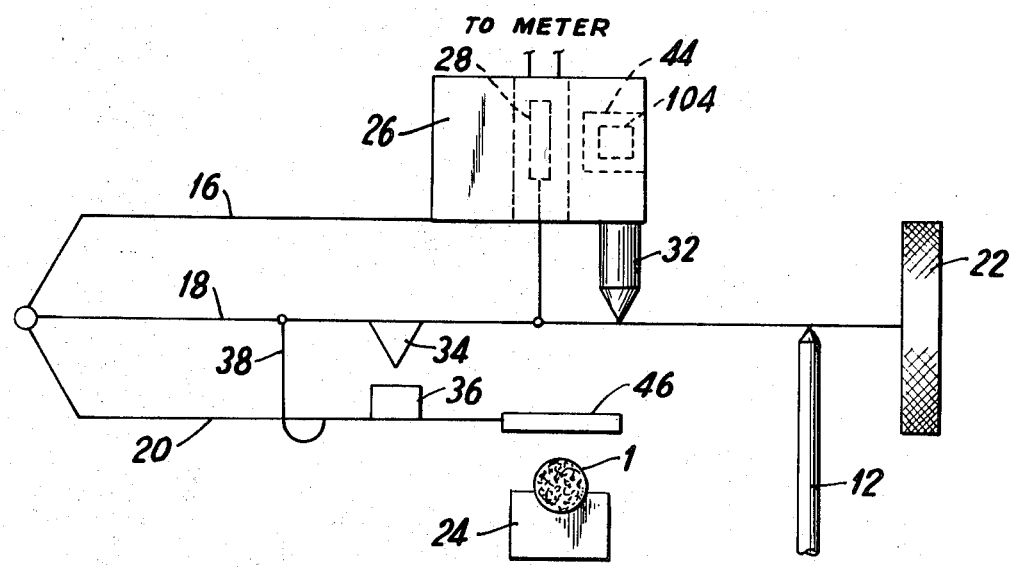
FIG. 2a shows a schematic view of the beam assembly prior to contact of the test specimen.
Figure 2B:
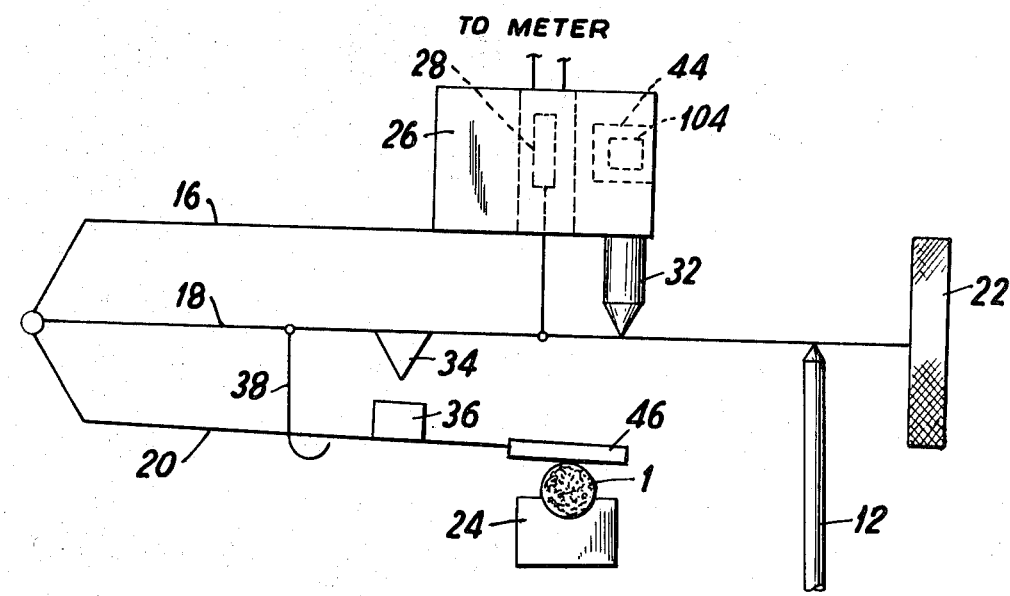
FIG. 2b shows a schematic view of the test specimen rotated to the point wherein the test specimen is initially contacted.
Figure 2C:
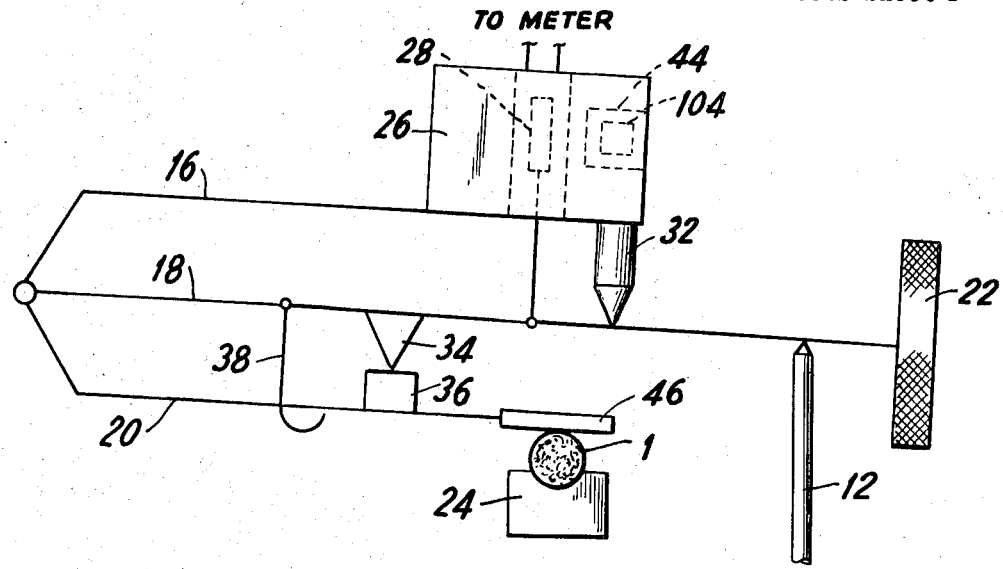
FIG. 2c shows the schematic view of the three-beam assembly rotated to the point wherein the middle and lower beam contacts meet.
Figure 2D:
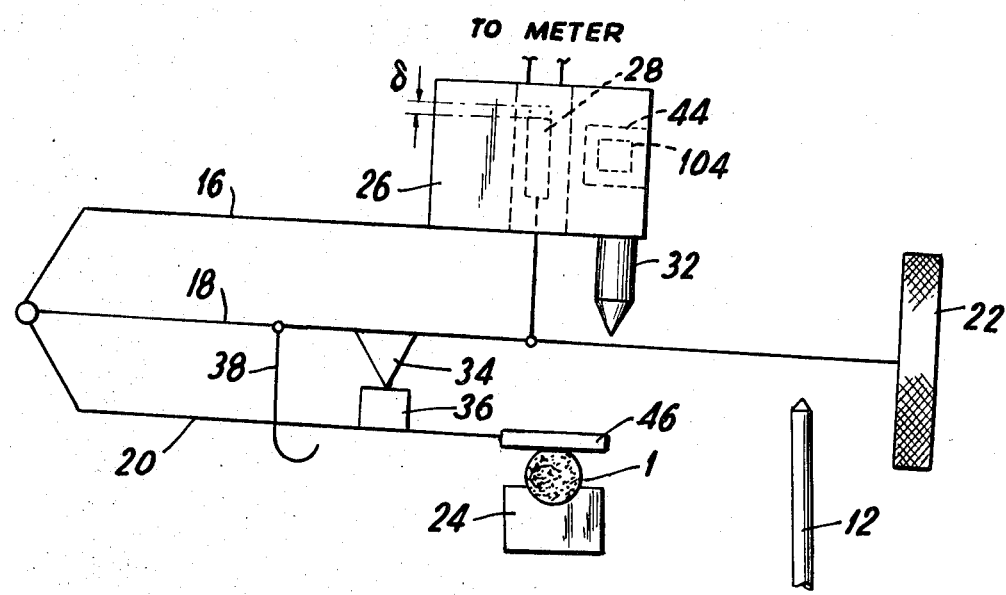
FIG. 2d shows a schematic view of the three-beam assembly in its final position after the test specimen has been fully compressed.
Figure 4:
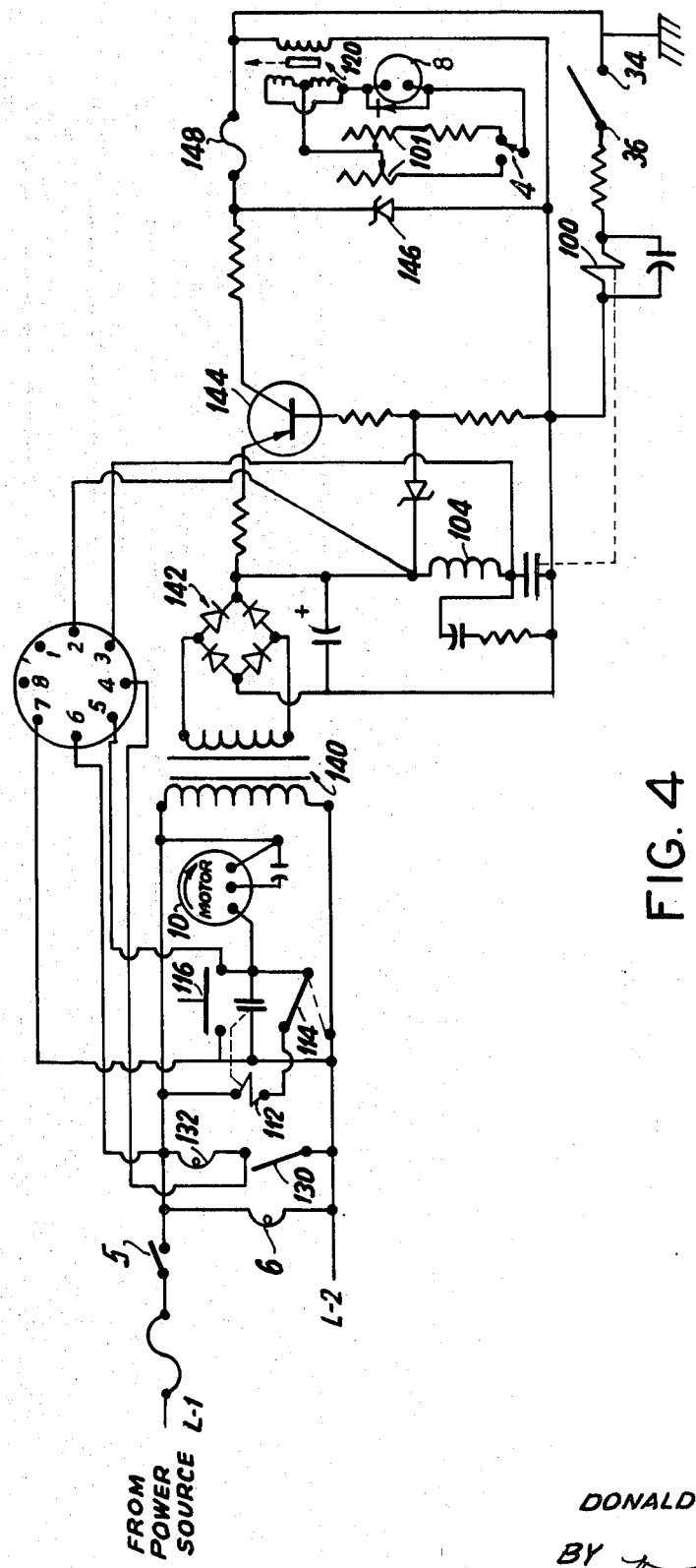
FIG. 4 is a circuit diagram of the assembly.

When the clockwise rotation has proceeded to the point wherein the electrical contact 34 formed on the lower surface of intermediate beam 18 and electrical contact 36 meet, best seen in FIG. 2c, a circuit leading to a brake relay 100 which is seen in FIG. 4, is closed. The brake relay switch 100 is closed and the coil 104 of electromagnetic brake 14 is energized and acts on the soft iron plate 44 to lock the transformer stator 26 and upper beam 16 in place while intermediate beam 18 and lower beam 20 begin to rotate concomitantly as a function of the firmness of the specimen. The force of weight 22 is transmitted and acts on the test specimen 1 through the mechanical linkage comprised of intermediate beam 18, contact 34, contact 36, lower beam 20 and pressure foot 46. Accordingly, the transformer core 28 which is fixed to the middle beam 18, will translate axially within the transformer stator 26 a distance equal to the penetration of the pressure foot 46 into the test specimen 1. Consequently, the transformer reactance will be varied, changing the output thereof. The transformer output is measured directly on meter 8 which is calibrated to measure the deflection in the most convenient units.

As best seen in FIG. 4, the meter 8 is provided with sensitivity regulation means 101 that enable the range to be adjusted to the optimum for varying test specimens.

In practice it has been found that the most satisfactory operation of the measuring apparatus is realized when the circuitry employed to interconnect the associated components is arranged as shown in FIG. 4. Basically, each measuring operation is initiated by energizing the momentary-contact start switch 116. The closing switch 116 energizes both the motor 10 and the holding relay 112. The holding relay 112 closes a set of contacts across the start switch 116, locking the motor 10 across the power line as long as switch 114 energizes relay 112. A cam on the motor shaft switches the contacts on switch 114 to open the relay circuit and close the motor circuit through the alternate path. At the end of the cycle, the cam returns switch 114 to the original circuit path to stop the motor 10.

This is a convenient means of allowing the operator to start the cycle with only a momentary touch of the start button 116.

Energization of motor 10 begins the retraction of the lift rod 12 which, in turn, allows the beam assembly to rotate as previously described. As the motor rotates the three-beam assembly, the electrical contacts 34 and 36 meet to close the brake relay 100 and energize the coil 104 of brake 14. Continued rotation of the motor 10 results in closing cam operated switch 130 to energize readout light 132 which signals the operator to read the meter.

In practice, it has been found that the provision of a transformer 140, a full wave rectifier 142 and a transistor 144 in combination with a Zener diode 146 will provide a regulated DC power supply to operate the brake and differential transformer 120. Similarly, the circuit has provided therein a fuse 148 to further protect the transformer.

I claim:
1. An apparatus for measuring the compressibility of a test specimen comprising:
 an anvil member adapted to support the test specimen;
 three beams adapted to be rotatably mounted at one end which are arranged in spaced vertical relationship with each other;
 a specimen contacting member extending from the lowest of the three beams at location directly above the anvil member;
 means to rotatably mount the three beams;
 means to bias the intermediate beam downwardly;
 means to rotate the three beams concomitantly;

means to transmit the force resulting from the bias on the intermediate beam to the test specimen;

means to hold the upper beam in a fixed position, when energized, with respect to one of the other beams, and to disengage said upper beam from rotating concomitantly with the other beams;

means to energize said holding means when said intermediate beam begins to exert a force on the test specimen; and means to measure the relative movement of said one of the other beams with respect to said upper beam in order to measure the deflection of the test specimen occurring as a result of the force exerted thereon by the bias.

2. A device for measuring the compressibility of a test specimen as recited in claim 1 wherein the three rotatably mounted beams are mounted for rotation on a common shaft.

3. A device for measuring the compressibility of a test specimen as recited in claim 2 wherein the means to bias the intermediate beam downwardly is a weight of predetermined mass.

4. A device for measuring the compressibility of a test specimen as recited in claim 3 wherein said holding means and said relative movement measuring means are comprised of:

a transducer-brake assembly disposed on one of said beams arranged to emit a signal which will vary as the distance between the upper beam and intermediate beam vary; and a meter to sense and indicate the variation in output signal of the transducer; and said energizing means comprises a means to energize the brake of the transducer-brake assembly at the instant the weight on the intermediate beam begins to exert a force on the test specimen in order to hold the upper beam in a fixed position with respect to the intermediate beam.

5. A device for measuring the compressibility of a test specimen as recited in claim 4 wherein the transducer of the transducer-brake assembly is a linear differential transformer, the stator of which is mounted on the upper beam and the core of which is mounted on the intermediate beam and arranged to extend axially into the stator.

6. A device for measuring the compressibility of a test specimen as recited in claim 5 wherein the brake of the transducer-brake assembly is comprised of:

an electromagnetic coil located adjacent to the transducer stator;

a soft iron plate rigidly fixed to the transducer stator adjacent the electromagnetic coil; and means to support the electromagnetic coil in a fixed position.

7. A device for measuring the compressibility of a test specimen as recited in claim 6 wherein the means to energize the electromagnetic brake is an electrical circuit comprised of:

a source of electrical power;

electrical conductors extending from the source of electrical power to the coil of the electromagnetic brake; and switch means which close the circuit the instant the weight begins to act on the test specimen.

8. A device for measuring the compressibility of a test specimen as recited in claim 7 wherein the switch which closes the circuit to the brake is comprised of:

an electrical contact formed on the lower surface of the intermediate beam; and a mating electrical contact formed on the upper surface of the lower beam.

9. A device for measuring the compressibility of a test specimen as described in claim 1 wherein the means for transmitting the force of the weight to the test specimen is a mechanical lever comprised of:

the intermediate beam;

a projection depending downwardly from the lower surface of the intermediate beam;

a projection extending upwardly from the upper surface of the lower beam; and the lower beam.

10. A device for measuring the compressibility of a test specimen as described in claim 8 wherein the means for transmitting the force of the weight to the test specimen is a mechanical lever comprised of the intermediate beam, a projection depending downwardly from the lower surface of the intermediate beam, a projection extending upwardly from the upper surface of the lower beam and the lower beam.

11. A device for measuring the compressibility of a test specimen as described in claim 1 wherein the means for rotating the three beams comprises a lift rod engaging the intermediate beam, and drive means coupled to said lift rod to effect concomitant rotation of the three beams.

12. A device for measuring the compressibility of a test specimen as described in claim 10 wherein the means for rotating the three beams is a lift rod driven by an electric motor and the means for rotatably mounting the beams is comprised of:

a simple bearing assembly.

13. The method of measuring the compressibility of a test specimen comprising the steps of:

placing a test specimen on a support surface;

moving an interconnected assembly comprised of a force-imposing means, a two-part penetration-sensing means and a specimen-contacting means concomitantly until the specimen-contacting means engages the test specimen;

continuing the concomitant movement of the force-imposing means and the penetration-sensing means until the force-imposing means has contacted the specimen-contacting means;

locking one part of the two-part penetration-sensing means in a fixed pisition;

moving the force-imposing member, the specimen-contacting member and the second part of the two-part penetration-sensing means in opposition to the resistance afforded by the test specimen; and measuring the distance the second part of the two-part penetration-sensing means moves with respect to the first part of the penetration-sensing means thereby determining the compressibility of the test specimen.

References Cited

UNITED STATES PATENTS

| | | | |
|---|---|---|---|
| 1,646,195 | 10/1927 | German | 73—81 |
| 2,277,199 | 3/1942 | Baxendale | 73—83 |
| 2,643,460 | 6/1953 | Dietert | 73—81 |

JAMES J. GILL, Primary Examiner

M. SMOLLAR, Assistant Examiner

U.S. Cl. X.R.

73—94